US012811425B2

(12) United States Patent
Hsu et al.

(10) Patent No.: US 12,811,425 B2
(45) Date of Patent: Nov. 24, 2026

(54) CHARGING/DISCHARGING CONTROL CIRCUIT

(71) Applicant: Realtek Semiconductor Corporation, Hsinchu (TW)

(72) Inventors: Hao-Cheng Hsu, Hsinchu (TW); Yu-Ting Chung, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 845 days.

(21) Appl. No.: 18/185,393

(22) Filed: Mar. 17, 2023

(65) Prior Publication Data

US 2024/0222994 A1 Jul. 4, 2024

(30) Foreign Application Priority Data

Dec. 30, 2022 (TW) ................................. 111150951

(51) Int. Cl.

*H02J 7/90* (2026.01)
*H02J 7/50* (2026.01)
*H02J 7/60* (2026.01)

(52) U.S. Cl.

CPC .............. *H02J 7/933* (2026.01); *H02J 7/575* (2026.01); *H02J 7/60* (2026.01)

(58) Field of Classification Search

CPC ............... H02J 7/933; H02J 7/575; H02J 7/60
USPC ........................................................ 327/170
See application file for complete search history.

(56) References Cited

U.S. PATENT DOCUMENTS

| | | | | |
|---|---|---|---|---|
| 7,126,391 B1 * | 10/2006 | Smith | .................. | H03K 17/223 327/143 |
| 2005/0156624 A1 * | 7/2005 | Sommer | .......... | H03K 19/00384 326/33 |
| 2010/0013542 A1 * | 1/2010 | Kuroda | ................ | H03K 17/166 327/427 |

* cited by examiner

*Primary Examiner* — Regis J Betsch
*Assistant Examiner* — Amit R Bhatia
(74) *Attorney, Agent, or Firm* — CKC & Partners Co., LLC

(57) ABSTRACT

A charging/discharging control circuit, comprising a first inverter circuit, a second inverter circuit and a driving circuit. The first inverter circuit is configured to generate a first control voltage on a first control node according to a threshold voltage of a first control transistor. The second inverter circuit is configured to generate a second control voltage on a second control node according to a threshold voltage of a second control transistor. The driving circuit is coupled to the first inverter circuit, the second inverter circuit and a load, and is configured to selectively charge or discharge the load according to the first control voltage or the second control voltage.

19 Claims, 5 Drawing Sheets

400

CHARGING/DISCHARGING CONTROL CIRCUIT

CROSS-REFERENCE TO RELATED APPLICATION

This application claims priority to Taiwan Application Serial Number 111150951, filed Dec. 30, 2022, which is herein incorporated by reference in its entirety.

BACKGROUND

Technical Field

The present disclosure relates to a control circuit, especially a circuit for controlling discharge or charge.

Description of Related Art

Generally speaking, when a circuit outputs a signal to a next-stage circuit or a next-stage load by an inverter. The inverter circuit is used as an output circuit, and its structure is simple. However, since slew rate of general inverter circuit cannot be controlled, the output signal will be input to the next stage circuit or the next load outside an expected time (e.g., too fast), which affects normal operation of the entire circuit system, such as abnormal charging/discharging, or electromagnetic interference. Therefore, how to make the slew rate of the inverter circuit controllable is a major issue at present.

SUMMARY

One aspect of the present disclosure is a charging/discharging control circuit, comprising a first inverter circuit, a second inverter circuit and a driving circuit. The first inverter circuit comprises a first switch element and a first control transistor. A first control node is between the first switch element and the first control transistor, and the first inverter circuit is configured to generate a first control voltage on the first control node according to a threshold voltage of the first control transistor. The second inverter circuit comprises a second switch element and a second control transistor. A second control node is between the second switch element and the second control transistor, and the second inverter circuit is configured to generate a second control voltage on the second control node according to a threshold voltage of the second control transistor. The driving circuit is coupled to the first inverter circuit, the second inverter circuit and a load, and is configured to selectively charge or discharge the load according to the first control voltage or the second control voltage.

Another aspect of the present disclosure is a charging/discharging control circuit, comprising a first inverter circuit, a second inverter circuit and a driving circuit. The first inverter circuit comprises a first switch element and a first control transistor. A first control node is between the first switch element and the first control transistor, and the first control transistor is connected in a diode form. The second inverter circuit comprises a second switch element and a second control transistor. A second control node is between the second switch element and the second control transistor, and the second control transistor is connected in a diode form. The driving circuit is coupled to the first inverter circuit, the second inverter circuit and a load, so as to selectively charge or discharge the load according to a voltage on the first control node or the second control node.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being “connected to” or “coupled to”, it can be directly connected or coupled to the other element or intervening elements may be present. In contrast, when an element to another element is referred to as being “directly connected” or “directly coupled,” there are no intervening elements present. As used herein, the term “and/or” includes an associated listed items or any and all combinations of more.

Figure 1:
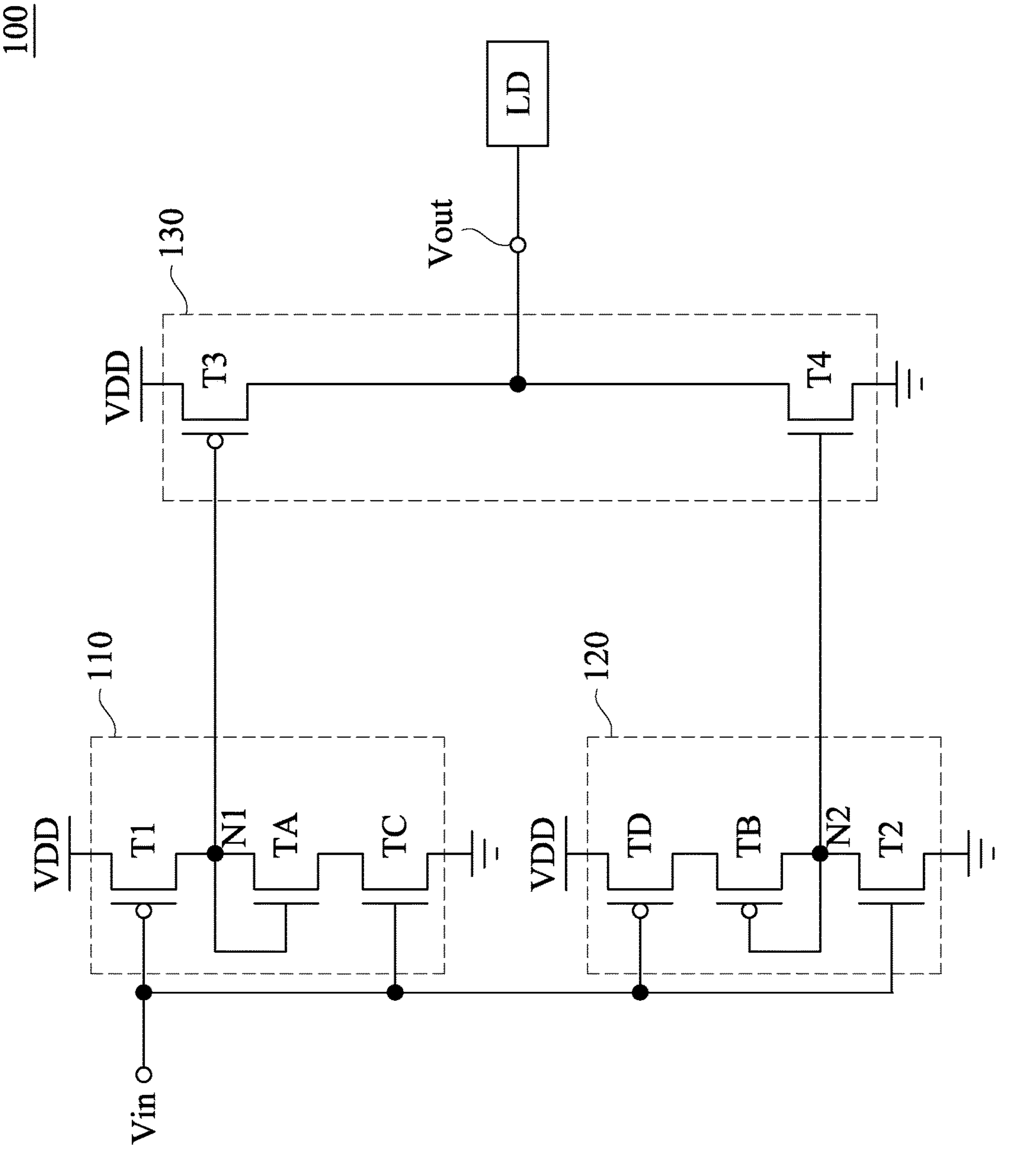
FIG. 1 is a schematic diagram of a charging/discharging control circuit in some embodiments of the present disclosure.

FIG. 1 is a schematic diagram of a charging/discharging control circuit 100 in some embodiments of the present disclosure. The charging/discharging control circuit 100 has an input terminal and an output terminal. The charging/discharging control circuit 100 receives an input signal Vin through the input terminal, and is coupled to a load LD (or a next stage circuit) through the output terminal. The charging/discharging control circuit 100 is configured to generate a charging signal or a discharge signal at the output terminal according to voltage level of the input signal Vin to charge the load LD or discharge the load LD.

The charging/discharging control circuit 100 includes a first inverter circuit 110, a second inverter circuit 120 and a driving circuit 130. The first inverter circuit 110 is coupled to the input terminal of the charging/discharging control circuit 100, so as to receive the input signal Vin, and is coupled to the driving circuit 130 through a first control node N1. Similarly, the second inverter circuit 120 is coupled to the input terminal of the charging/discharging control circuit 100, so as to receive the input signal Vin, and is coupled to the driving circuit 130 through a second control node N2. The driving circuit 130 is coupled to the first inverter circuit 110 through the first control node N1, and is coupled to the second inverter circuit 120 through the second control node N2. The output terminal of driving circuit 130 is coupled to the load LD (or the next stage circuit). The driving circuit 130 is configured to generate a control signal Vout at the output terminal of the charging/discharging control circuit 100 according to the voltage of the first control node N1 or the second control node N2, to selectively charge or discharge the load LD.

Specifically, the first inverter circuit 110 includes a first switch element T1 and a first control transistor TA. A control terminal of the first switch element T1 is configured to receive the input signal Vin, two terminals of the first switch element T1 are respectively coupled to a power supply VDD and the first control transistor TA, and a first control node N1 is arranged between the first switch element T1 and the first control transistor TA. A first terminal of the first control transistor TA is coupled to the power supply VDD through the first switch element T1, and a second terminal of the first control transistor TA is coupled to a reference potential (e.g., ground). That is, the first switch element T1 is coupled to the reference potential through the first control transistor TA. According to different levels of the input signal Vin, the first inverter circuit 110 selectively charges the first control node N1 by the power supply VDD, or discharges the first control node N1 by the first control transistor TA.

Similarly, the second inverter circuit 120 includes a second switch element T2 and a second control transistor TB. A control terminal of the second switch element T2 is configured to receive the input signal Vin, two terminals of the second switch element T2 are coupled to the reference potential (e.g., ground) and the second control transistor TB respectively, and a second control node N2 is arranged between the second switch element T2 and the second control transistor TB. A first terminal of the second control transistor TB is coupled to the power supply VDD, a second terminal of the second control transistor TB is coupled to the reference potential (e.g., ground) through the second switch element T2. That is, the second switch element T2 is coupled to the power supply VDD through the second control transistor TB. According to different levels of the input signal Vin, the second inverter circuit 120 selectively charges the second control node N2 by the power supply VDD and the second control transistor TB, or discharges the second control node by the second switch element T2.

In this embodiment, the first control transistor TA and the second control transistor TB are applied as active loads and can be considered as an impedance element. Therefore, when the first control node N1 is discharged, voltage value of the first control node N1 will depend on threshold voltage of the first control transistor TA. In other words, the first inverter circuit 110 generates a first control voltage at the first control node N1 according to the threshold voltage of the first control transistor TA. The first control voltage is used as the charging signal, so that the driving circuit 130 charges the load LD.

Similarly, when the second control node N2 is discharged, voltage value of the second control node N2 will depend on the threshold voltage of the second control transistor TB. In other words, the second inverter circuit 120 generates a second control voltage at the second control node N2 according to the threshold voltage of the second control transistor TB. The second control voltage is used to serve as the discharge signal, so that the load LD can be discharged by the driving circuit 130.

In one embodiment, the first control transistor TA and the second control transistor TB are respectively connected in a diode form (diode-connected), so as to be an active load. For example, gate terminal and drain terminal of the first control transistor TA (or the second control transistor TB) are coupled or shorted to each other.

In one embodiment, the driving circuit 130 includes a first driving transistor T3, a control terminal of the first driving transistor T3 is coupled to the first control node N1. Accordingly, since when the driving circuit 130 charges the load LD, the voltage of the first control node N1 (i.e., voltage of the control terminal of the first driving transistor T3) is affected by the threshold voltage of the first control transistor TA, a charging current on the driving circuit 130 (corresponding to charging speed) can be adjusted by selecting structural parameters of the first control transistor TA (corresponding to the threshold voltage), and a slew rate of the charging/discharging control circuit 100 can also be changed.

Similarly, the driving circuit 130 further includes a second driving transistor T4, the second driving transistor T4 is coupled to the first driving transistor T3, and a control terminal of the second driving transistor T4 is coupled to the second control node N2. A node between the first driving transistor T3 and the second driving transistor T4 is configured to be the output terminal of the charging/discharging control circuit 100. The voltage of the output terminal is used as the control signal Vout, so as to selectively charge or discharge the load LD. Since when the load LD is discharged by the driving circuit 130, the voltage of the second control node N2 (i.e., voltage of the control terminal of the second driving transistor T4) is affected by the threshold voltage of the second control transistor TB, a charging current on the driving circuit 130 (corresponding to charging speed) can be adjusted by selecting structural parameters of the second control transistor TB (corresponding to the threshold voltage), and the slew rate of the charging/discharging control circuit 100 can also be changed.

The "structural parameters" of the aforementioned control transistor TA/TB can be size of channel in the transistor. Taking metal oxide semiconductor field effect transistors as an example, threshold voltage is affected by structural parameters such as gate channel width (W) and gate channel length (L). In other words, voltage of the first control node N1 or the second control node N2 can be changed by designing the gate channel width (W) or gate channel length (L) of the control transistor TA/TB, thereby controlling charging/discharging speed or slew rate of the charging/discharging control circuit 100.

As shown in FIG. 1, in this embodiment, the first inverter circuit 110 further includes a first auxiliary transistor TC. The first auxiliary transistor TC is coupled to the first control transistor TA, and a control terminal of the first auxiliary transistor TC is coupled to the input terminal of the charging/discharging control circuit 100, so as to be turned on or off according to the input signal Vin. The first auxiliary transistor TC is coupled between the first control node N1 and the reference potential.

In addition, in this embodiment, the second inverter circuit 120 further includes a second auxiliary transistor TD. The second auxiliary transistor TD is coupled to the second control transistor TB, and the control terminal of the second auxiliary transistor TD is coupled to the input terminal of the charging/discharging control circuit 100, so as to be turned on or off according to the input signal Vin. The second auxiliary transistor TD is coupled between the second control node N2 and the power supply VDD.

Figure 2A:
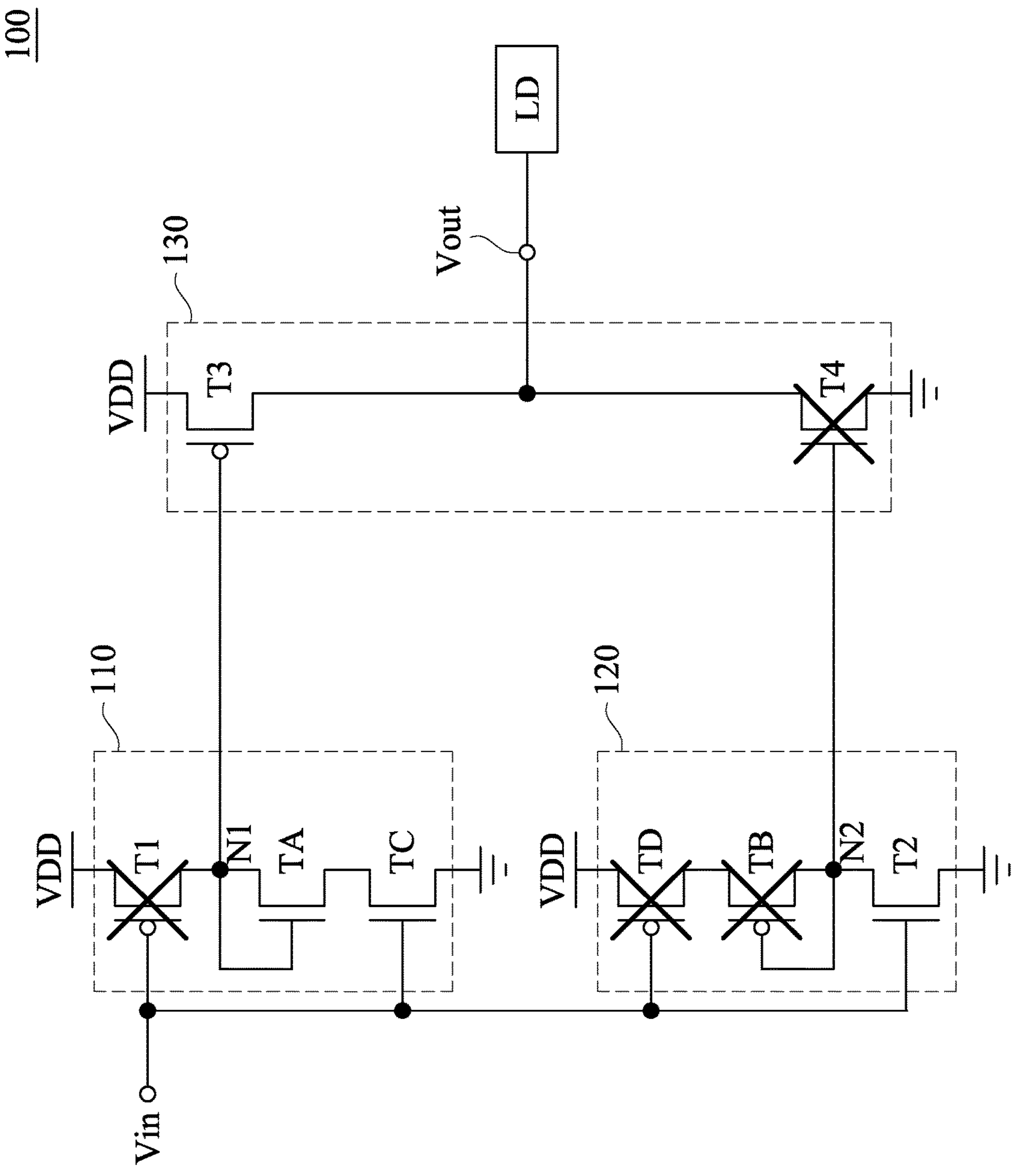
FIG. 2A is a schematic diagram of an operation of the charging/discharging control circuit for charging control.
Figure 2B:
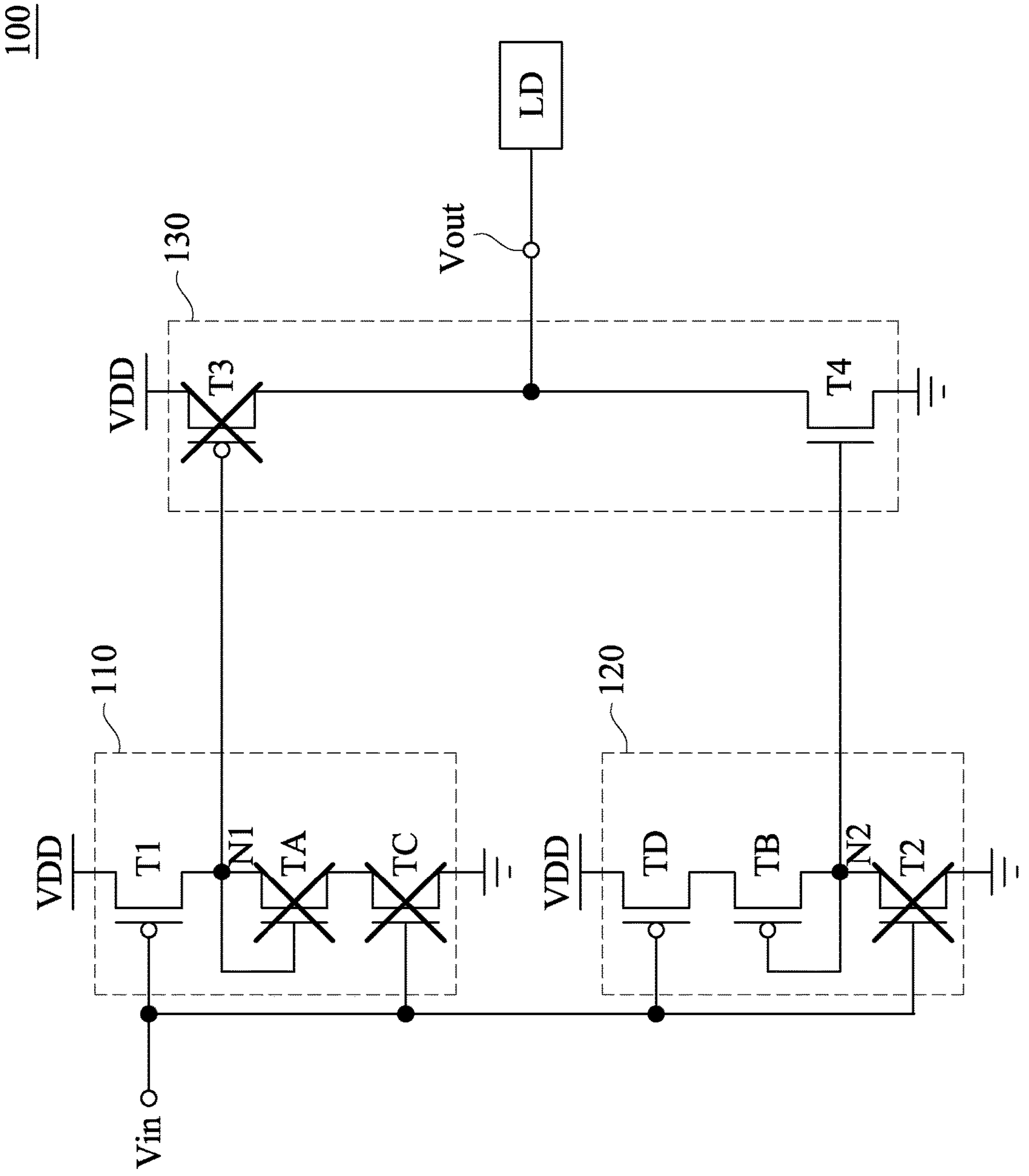
FIG. 2B is a schematic diagram of an operation of the charging/discharging control circuit for discharging control.

FIG. 2A and FIG. 2B are schematic diagrams of operations of the charging/discharging control circuit 100 for charging control or discharging control. The first switch element T1 and the second switch element T2 are turned on or off according to signals with different levels. That is, switching state of the first switch element T1 and the second switch element T2 are opposite. In this embodiment, the second switch element T2, the second driving transistor T4, the first control transistor TA and the first auxiliary transistor TC are N-type metal oxide semiconductor field effect transistors. The first switch element T1, the first driving transistor T3, the second control transistor TB and the second auxiliary transistor TD are P-type metal oxide semiconductor field effect transistors.

As shown in FIG. 2A, during the charging control, the the input terminal of the charging/discharging control circuit 100 receives the input signal Vin with a corresponding level (e.g., high voltage). At this time, the first switch element T1 is turned off according to the input signal Vin, and the first auxiliary transistor TC is turned on according to the input signal Vin. The first control transistor TA is turned on according to the first control node N1 (which has been previously charged to a high voltage by the power supply VDD). Therefore, the voltage of the first control node N1 will be discharged by the first control transistor TA and the first auxiliary transistor TC. In other words, the first control transistor TA is configured to discharge the first control voltage of the first control node N1.

On the other hand, the second switch element T2 is turned on according to the input signal Vin, and the second auxiliary transistor TD is turned off according to the input signal Vin. The second control transistor TB is also turned off. Therefore, the voltage value of the second control node N2 is opposite to the input signal Vin (e.g., low voltage), so that the second driving transistor T4 is also turned off. At this time, the second switch element T2 discharge the second control node N2 (i.e., voltage of the second control node N2 will be discharged by the second switch element T2.)

As mentioned above, as shown in FIG. 2A, assuming that the first auxiliary transistor TC is an ideal transistor (i.e., impedance is zero when it is turned on), and the reference potential is ground. The voltage of the first control node N1 will eventually be discharged to be equal to "the threshold voltage (Vth) of the first control transistor TA", that is, the first control voltage (the charging signal). At this time, the driving circuit 130 charges the load LD according to "voltage difference between the power supply VDD and the threshold voltage of the first control transistor TA".

Specifically, the first driving transistor T3 will be turned on according to the first control voltage of the first control node N1 to charge the load LD. The voltage difference (Vgs) between the source and gate of the first driving transistor T3 is "voltage difference between the power supply VDD and the threshold voltage of the first control transistor TA". An overdrive voltage of the first driving transistor T3 will be "the voltage difference between the power supply VDD and the threshold voltage of the first control transistor TA" minus "the threshold voltage of the first driving transistor T3". The voltage of the control terminal of the first driving transistor T3 (i.e., the first control voltage) is configured to determine speed at which the driving circuit 130 charges the load LD by the power supply VDD.

As shown in FIG. 2B, during the discharging control, the input terminal of the charging/discharging control circuit 100 receives the input signal Vin with a corresponding level (e.g., low voltage). At this time, the first switch element T1 is turned on according to the input signal Vin, and the first auxiliary transistor TC is turned off according to the input signal Vin. The first control transistor TA is also turned off. The first switch element T1 charges the first control node N1 by the power supply VDD. At this time, the voltage value of the first control node N1 is opposite to the input signal Vin (e.g., high voltage), so that the first driving transistor T3 is turned off.

On the other hand, the second switch element T2 is turned off according to the input signal Vin, and the second auxiliary transistor TD is turned on according to the input signal Vin. The second control transistor TB will be charged by the power supply VDD. Assuming that the second auxiliary transistor TD is an ideal transistor (i.e., impedance is zero when it is turned on), the voltage of the second control node N2 will eventually be charged to be equal to "voltage of the power supply VDD minus the threshold voltage of the second control transistor TB (i.e., VDD-Vth)", that is, the second control voltage (the discharge signal). In other words, the second control transistor TB is configured to charge the second control node N2 by the power supply VDD.

As mentioned above, as shown in FIG. 2B, the second driving transistor T4 will be turned on according to the second control voltage on the second control node N2 to discharge the load LD (i.e., the load will discharge by the second driving transistor T4). Specifically, overdrive voltage of the second driving transistor T4 will be "the voltage difference between the power supply VDD and the threshold voltage of the second control transistor TB" minus "the threshold voltage of the second driving transistor T4" ("threshold voltage" here is calculated in absolute value). In other words, the driving circuit 130 discharges the load LD according to "the voltage difference between the power supply VDD and the threshold voltage of the second control transistor TB." The voltage of the control terminal of the second driving transistor T4 (i.e., the second control voltage) is configured to determine speed at which the load LD discharges by the driving circuit 130.

Figure 3:
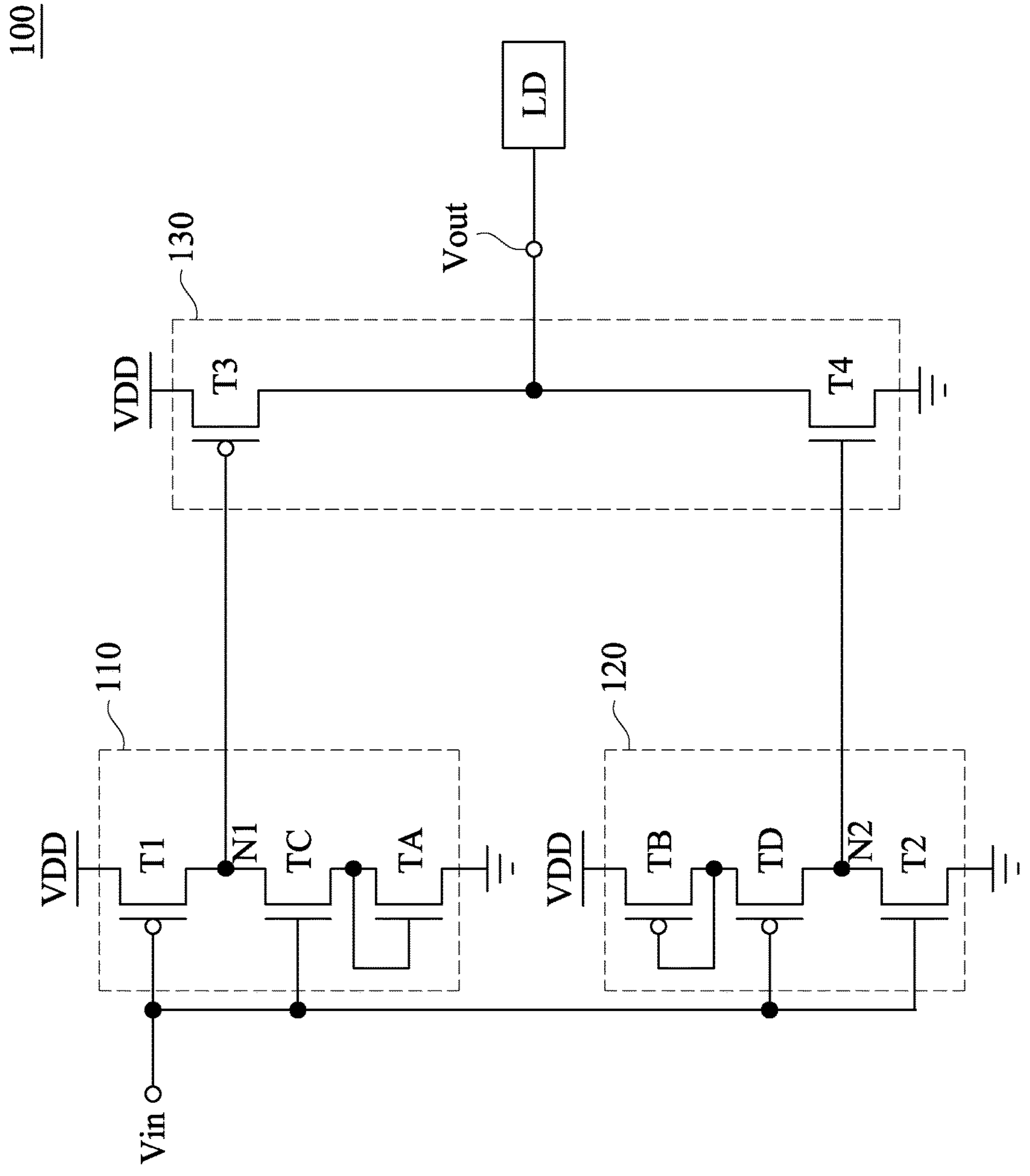
FIG. 3 is a schematic diagram of a charging/discharging control circuit in some other embodiments of the present disclosure.

FIG. 3 is a schematic diagram of a charging/discharging control circuit 100 in some other embodiments of the present disclosure. In FIG. 3, the similar components associated with the embodiment of FIG. 1 are labeled with the same numerals for ease of understanding. The specific principle of the similar component has been explained in detail in the previous paragraphs, and unless it has a cooperative relationship with the components of FIG. 3, it is not repeated here.

In the embodiment in FIG. 1, the first auxiliary transistor TC is coupled to the first control transistor TA and the reference potential. The first auxiliary transistor TC is configured to prevent abnormal leakage of the first inverter circuit 110. For example, when the first switch element T1 is turned on so that the first control node N1 is charged by the power supply VDD, the first auxiliary transistor TC will be turned off by the input signal Vin to ensure that the charging voltage on the first control node N1 will not be affected by the leakage of the first control transistor TA. Therefore, positions of the first auxiliary transistor TC and the first control transistor TA can be reversed. That is, as shown in FIG. 3, the first auxiliary transistor TC can be coupled between the first control node N1 and the first control transistor TA.

Similarly, the second auxiliary transistor TD is configured to prevent abnormal leakage of the second inverter circuit 120. Therefore, positions of the second auxiliary transistor TD and the second control transistor TB can be reversed. That is, as shown in FIG. 3, the second auxiliary transistor TD can be coupled between the second control node N2 and the second control transistor TB.

In addition, since a slight leakage does not seriously affect the control voltage on the first control node N1 and the second control node N2, in some other embodiments, the charging/discharging control circuit 100 may not be configured with the first auxiliary transistor TC and/or the second auxiliary transistor TD.

On the other hand, in some other embodiments, the charging/discharging control circuit 100 may not include the driving circuit 130. The charging/discharging control circuit 100 may only include the first inverter circuit 110 and the second inverter circuit 120, so as to generate the charging signal on the first control node N1, or generate the discharge signal on the second control node N2. In this embodiment, the first inverter circuit 110 and the second inverter circuit 120 can be respectively coupled to a charging circuit and a discharging circuit, so as to drive the charging circuit by the charging signal of the first control node N1, or drive the discharging circuit by the discharge signal of the second control node N2.

Figure 4:
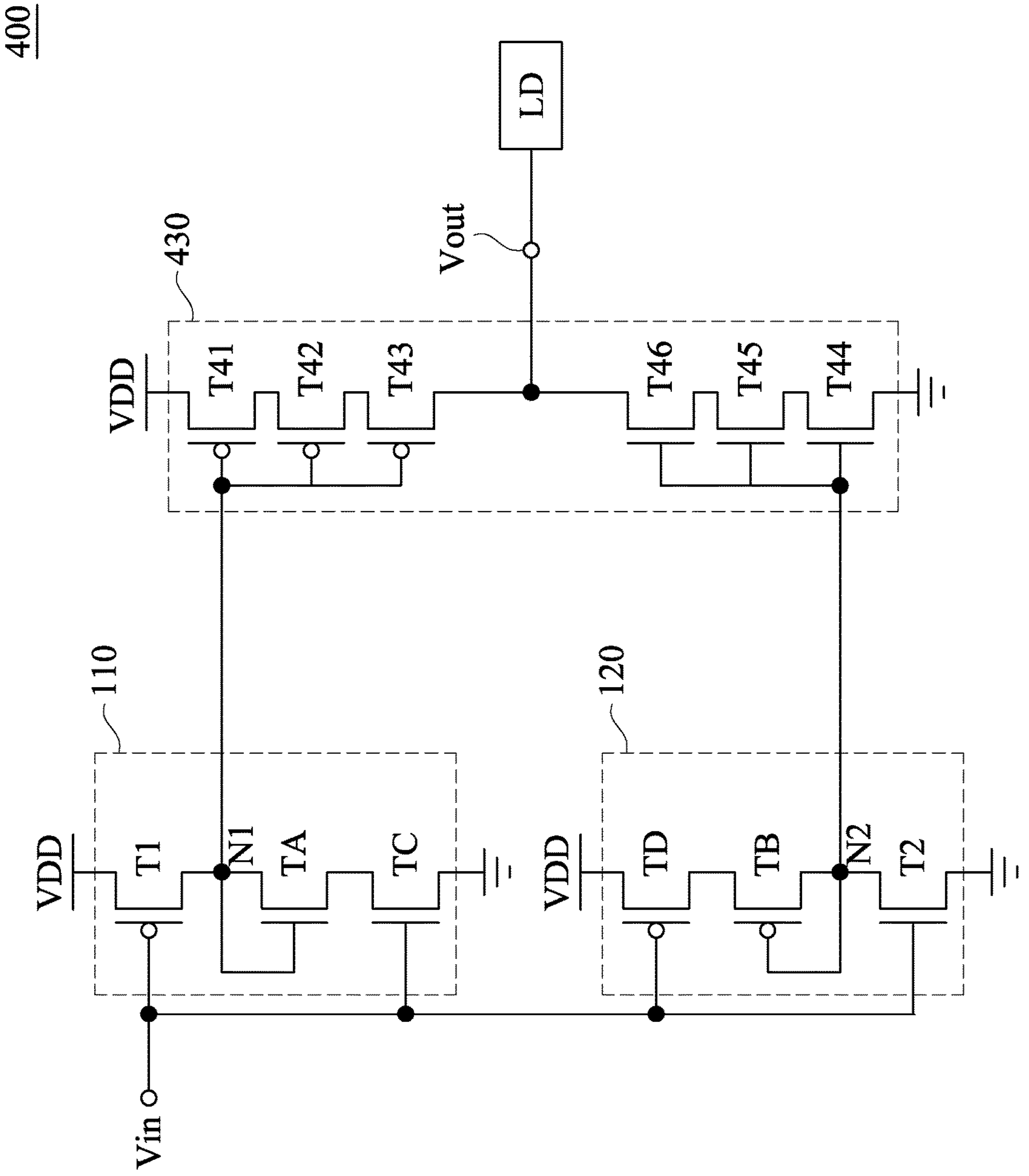
FIG. 4 is a schematic diagram of a charging/discharging control circuit in some other embodiments of the present disclosure.

FIG. 4 is a schematic diagram of a charging/discharging control circuit 400 in some other embodiments of the present disclosure. In FIG. 4, the similar components associated with the embodiment of FIG. 1 are labeled with the same numerals for ease of understanding. The specific principle of the similar component has been explained in detail in the previous paragraphs, and unless it has a cooperative relationship with the components of FIG. 4, it is not repeated here.

As shown in FIG. 4, the charging/discharging control circuit 400 includes a first inverter circuit 110, a second inverter circuit 120 and a driving circuit 430. Structures of the first inverter circuit 110 and the second inverter circuit 120 are the same as the embodiment shown in FIG. 1, so it will not be described further here.

In one embodiment, the driving circuit 430 includes multiple drive transistors connected in series. The control terminal of each driving transistor is coupled to the first control node N1 or the second control node N2. Accordingly, equivalent output resistance of the driving circuit 430 can be increased to increase the charging time or discharging time.

Specifically, the driving circuit 430 includes multiple first driving transistors T41-T43 and multiple second driving transistors T44-T46. Control terminals of the first driving transistors T41-T43 are coupled to the first control node N1, Control terminals of the second driving transistors T44-T46 are coupled to the second control node N2. The number of the first driving transistors T41-T43 and the second transistors T44-T46 can be adjusted according to actual needs.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A charging/discharging control circuit, comprising:

a first inverter circuit comprising a first switch element and a first control transistor, wherein a first control node is between the first switch element and the first control transistor, and the first inverter circuit is configured to generate a first control voltage on the first control node according to a threshold voltage of the first control transistor;

a second inverter circuit comprising a second switch element and a second control transistor, wherein a second control node is between the second switch element and the second control transistor, and the second inverter circuit is configured to generate a second control voltage on the second control node according to a threshold voltage of the second control transistor; and a driving circuit coupled to the first inverter circuit, the second inverter circuit and a load, and configured to selectively charge or discharge the load according to the first control voltage or the second control voltage;

wherein the driving circuit comprises at least one first driving transistor, when the first switch element is turned off according to an input signal, the at least one first driving transistor is turned on according to the first control voltage to charge the load.

2. The charging/discharging control circuit of claim 1, wherein when the first switch element is turned off according to the input signal, the second switch element is turned on, and the first control transistor is configured to discharge the first control node.

3. The charging/discharging control circuit of claim 2, wherein the first inverter circuit further comprises a first auxiliary transistor, the first auxiliary transistor is coupled to the first control transistor, when the first switch element is turned on according to the input signal, the first auxiliary transistor is turned off according to the input signal.

4. The charging/discharging control circuit of claim 1, wherein when the second switch element is turned off according to the input signal, the first switch element is turned on, and the second control transistor is configured to charge the second control node by a power supply.

5. The charging/discharging control circuit of claim 4, wherein the second inverter circuit further comprises a second auxiliary transistor, the second auxiliary transistor is coupled to the second control transistor, when the second switch element is turned on according to the input signal, the second auxiliary transistor is turned off according to the input signal.

6. The charging/discharging control circuit of claim 1, wherein the driving circuit comprises at least one second driving transistor, when the second switch element is turned off according to the input signal, the at least one second driving transistor is turned on according to the second control voltage to discharge the load.

7. The charging/discharging control circuit of claim 1, wherein when the first switch element is turned on according to the input signal, the first switch element charges the first control node by a power supply.

8. The charging/discharging control circuit of claim 1, wherein when the second switch element is turned on according to the input signal, the second switch element discharge the second control node.

9. The charging/discharging control circuit of claim 1, wherein the driving circuit is coupled to a power supply, and the driving circuit is configured to charge the load according to a voltage difference between the power supply and the threshold voltage of the first control transistor.

10. A charging/discharging control circuit, comprising:

a first inverter circuit comprising a first switch element and a first control transistor, wherein a first control node is between the first switch element and the first control transistor, and the first control transistor is connected in a diode form;

a second inverter circuit comprising a second switch element and a second control transistor, wherein a second control node is between the second switch element and the second control transistor, and the second control transistor is connected in a diode form; and a driving circuit coupled to the first inverter circuit, the second inverter circuit and a load, so as to selectively charge or discharge the load according to a voltage on the first control node or the second control node;

wherein when the first switch element is turned off according to an input signal, the second switch element is turned on, and the first control transistor is configured to discharge the first control node.

11. The charging/discharging control circuit of claim 10, wherein the first switch element and the second switch element are turned on or off according to different levels of the input signal, and the first switch element is coupled to a reference potential through the first control transistor.

12. The charging/discharging control circuit of claim 11, wherein the first inverter circuit further comprises a first auxiliary transistor, the first auxiliary transistor is configured to turn on or off according to the input signal, and is coupled between the first control node and the reference potential.

13. The charging/discharging control circuit of claim 10, wherein the first switch element and the second switch element are turned on or off according to different levels of the input signal, and the second switch element is coupled to a power supply through the second control transistor.

14. The charging/discharging control circuit of claim 13, wherein the second inverter circuit further comprises a second auxiliary transistor, the second auxiliary transistor is configured to turn on or off according to the input signal, and is coupled between the second control node and the power supply.

15. The charging/discharging control circuit of claim 10, wherein the driving circuit comprises a first driving transistor, a control terminal of the first driving transistor is coupled to the first control node.

16. The charging/discharging control circuit of claim 15, wherein the driving circuit comprises a second driving transistor, a control terminal of the second driving transistor is coupled to the second control node.

17. The charging/discharging control circuit of claim 15, wherein the driving circuit comprises a plurality of driving transistors, the plurality of driving transistors are connected in series and coupled to the first control node or the second control node.

18. A charging/discharging control circuit, comprising:

a first inverter circuit comprising a first switch element and a first control transistor, wherein a first terminal of the first control transistor is coupled to a power supply through the first switch element, a second terminal of the first control transistor is coupled to a reference potential, so that a first control node between the first switch element and the first control transistor is charged by the power supply, or is discharged by the first control transistor; and a second inverter circuit comprising a second switch element and a second control transistor, wherein a first terminal of the second control transistor is coupled to the power supply, a second terminal of the second control transistor is coupled to the reference potential through the second switch element, so that a second control node between the second switch element and the second control transistor is charged by the power supply, or is discharged by the second control transistor;

wherein when the second switch element is turned off according to an input signal, the first switch element is turned on, and the second control transistor is configured to charge the second control node by the power supply.

19. The charging/discharging control circuit of claim 18, wherein the first inverter circuit is configured to generate a first control voltage on the first control node according to a threshold voltage of the first control transistor; and the second inverter circuit is configured to generate a second control voltage on the second control node according to a threshold voltage of the second control transistor.

* * * * *